Feb. 18, 1941.  W. V. SMITH  2,232,487
MACHINE FOR MAKING TIRE TREADS
Filed Dec. 1, 1937  7 Sheets-Sheet 1

INVENTOR.
Walter V. Smith
BY Chapin + Neal
ATTORNEYS

Feb. 18, 1941.   W. V. SMITH   2,232,487
MACHINE FOR MAKING TIRE TREADS
Filed Dec. 1, 1937   7 Sheets-Sheet 2

Fig. 2

INVENTOR.
Walter V. Smith
BY
Chapin & Neal
ATTORNEYS.

Feb. 18, 1941.  W. V. SMITH  2,232,487
MACHINE FOR MAKING TIRE TREADS
Filed Dec. 1, 1937  7 Sheets-Sheet 3

INVENTOR.
Walter V. Smith
BY
Chapin & Neal
ATTORNEYS.

Fig. 11

Patented Feb. 18, 1941

2,232,487

UNITED STATES PATENT OFFICE 2,232,487

MACHINE FOR MAKING TIRE TREADS

Walter V. Smith, South Hadley Falls, Mass., assignor, by mesne assignments, to United States Rubber Company, New York, N. Y., a corporation of New Jersey Application December 1, 1937, Serial No. 177,646

21 Claims. (Cl. 154—9)

This invention relates to the manufacture of pneumatic or other tires, the tread portions of which are formed of a rubber compound, and more particularly to the construction of such tread portions.

The principal object of the invention is the provision of a machine for providing a tire tread, formed of suitable tread stock, with inserts of a different material such as a gum stock.

A further object of the invention is to provide a machine having the above general object in view but specifically adapted for inserting strips of material edgewise into the tread portion of a tire.

Other and further objects reside in the means and combinations of means for handling and performing the various operations on the tread and the inserted material and for rendering these operations automatic.

In the accompanying drawings, which illustrate one embodiment of the invention—

Figure 13:
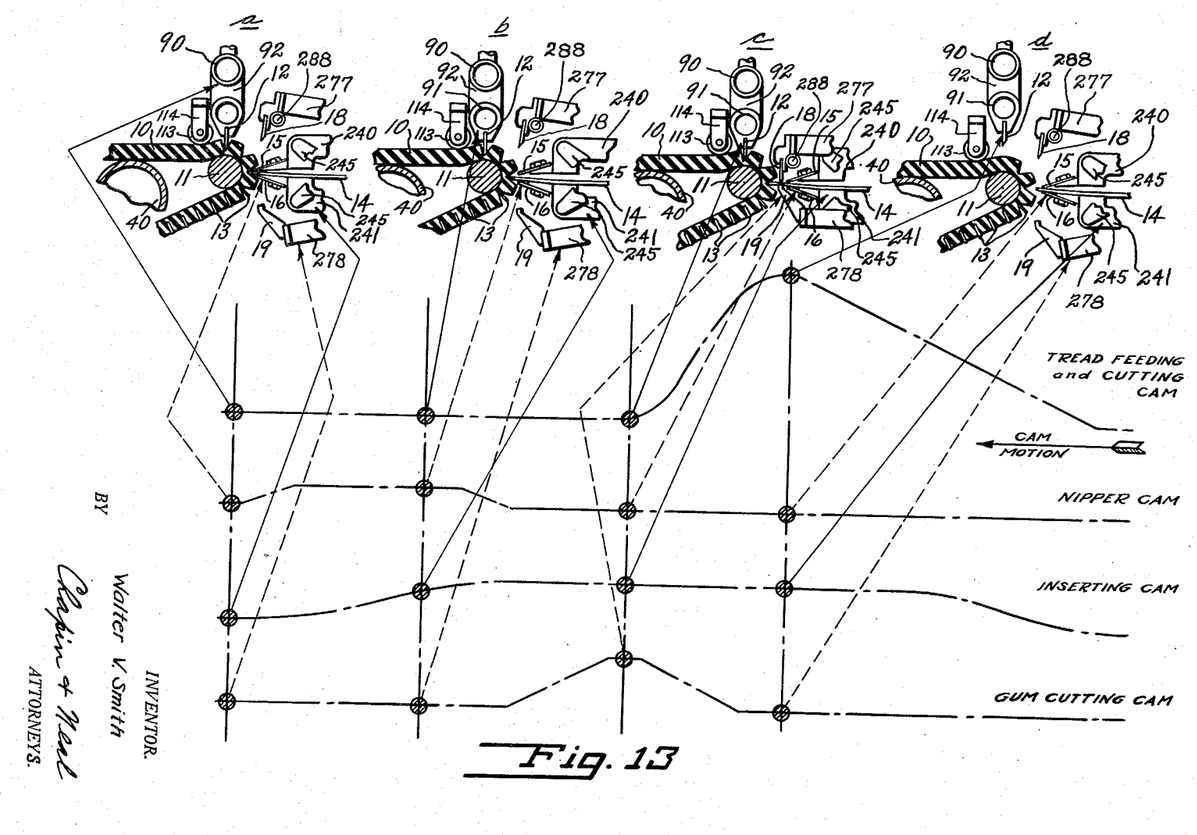
Fig. 13 is a diagram showing the development of the principal cam surfaces with the positions of some of the parts they control diagrammatically indicated.

The embodiment of the invention illustrated is particularly adapted for the edgewise insertion of a succession of strips of gum rubber into a length of tread stock, the gum strips extending transversely of the tread and spaced from each other longitudinally of the tread. For a preliminary understanding of the general operation reference is made to Fig. 13. As shown in the latter figure, tread length 10 is intermittently advanced around a roll 11 which imparts a sharp curvature to the tread, placing its outer surface under tension so that as a cut is made by the knife 12 the cut springs open and remains open for the reception of the inserts. The inserts indicated at 13 are formed from a web or strip of gum rubber 14, the forward end of which is held between grippers generally indicated at 15—16. Position d of Fig. 13 at the right of the figure, shows the parts in their position at the start (and end) of a cycle of operation, the knife 12 and the grippers 15—16 being retracted from the tread, the grippers being in line with an opened cut made at a preceding cutting operation. In the first movement of the cycle the knife comes down to form a cut in the tread and the grippers advance into the already formed cut to bring the end of the gum strip into adhering contact with the tread stock at the bottom of the cut as shown in position a. The grippers then separate and are withdrawn backwardly along the gum strip as shown in position b. The grippers move back to initial position where they are closed to again grip the strip and the strip is severed by cutter members 18—19 at a point slightly beyond the gripper jaws, as shown in position c. The knife 12 is then withdrawn, members 18—19 retracted, and the tread advanced to bring the parts to the initial position d.

Figure 1:
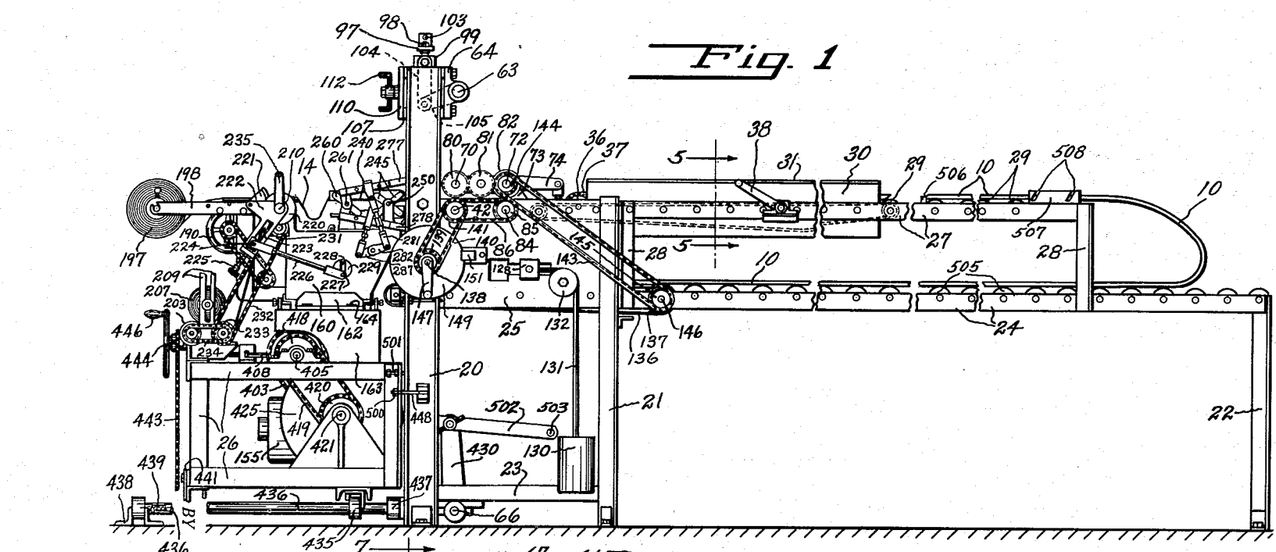
Fig. 1 is a side view of the machine with parts broken away to reduce the length of the tread conveyer.

Turning now to Fig. 1, the various instrumentalities are supported by a frame structure which includes spaced pairs of uprights 20, 21, and 22, longitudinal side members 23 and 24, side plates 25, and a rectangular frame member 26.

Figures 4, 9, 10:
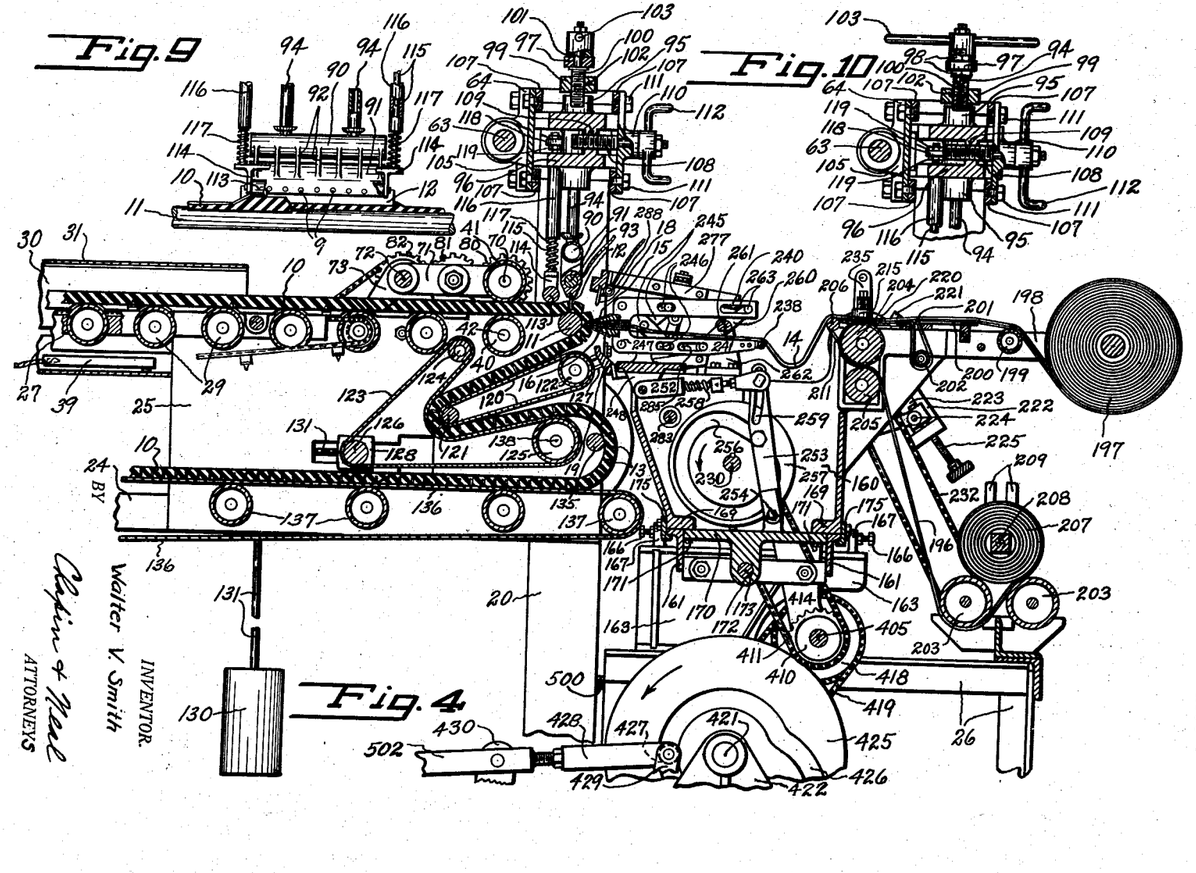
Fig. 4 is a sectional view substantially on line 4—4 in Fig. 2.
Fig. 9 is a detail view showing the tread cutter in front elevation.
Fig. 10 is a sectional view of the tread knife adjusting means with the parts in a slightly different position of adjustment from the position of Fig. 4.
Figure 5:
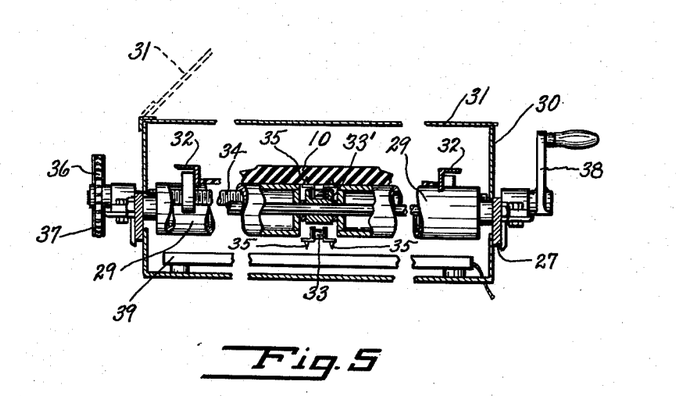
Fig. 5 is a sectional view substantially on line 5—5 in Fig. 1 and on a larger scale.

The tread stock may be fed to the machine by any suitable means. In the form shown (see Fig. 1) tread lengths are spliced end to end on a table member 27, supported on frame members 24 by posts 28 and provided with anti-friction rolls 29. The spliced tread strip passes through a casing 30 having a hinged lid 31. Suitable tread guides may be provided such as member 32 (Fig. 5) which are mounted on threaded shafts 34 for adjustment toward and from each other by rotation of the shafts. The shafts 34 are provided with sprockets 36 connected together by a sprocket chain 37 (Figs. 1 and 3) for simultaneous operation by a crank 38, secured to one of the shafts 34. The casing 30 is provided (Fig. 4 and Fig. 5) with an electrical heating element 39 so that the temperature of the tread stock may be controlled if desired.

As a further means for guiding the tread strips a chain 33 provided with spikes 35 is trained around sprockets positioned centrally of one of the forward and one of the rear rolls 29. The upper run of the chain rides in a channeled guide 33', Fig. 5, which is supported on the shafts of the rolls 29, which latter are divided in halves. As the tread length is drawn forward, as presently to be described, it is pressed onto the spikes 35 and the chain is drawn freely along with the tread, the channel 33' holding the chain and tread to their course as they enter the machine.

Figures 6, 7, 8:
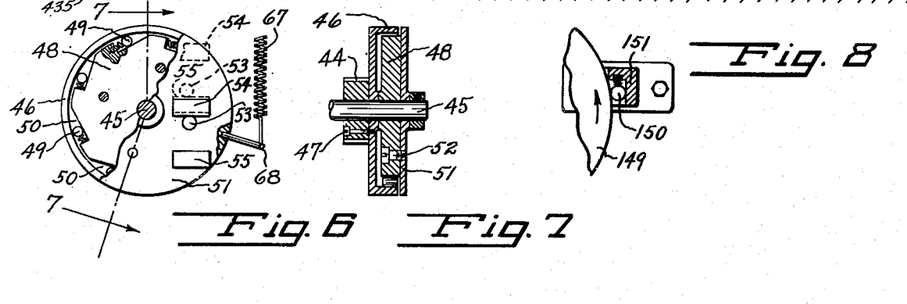
Fig. 6 is a sectional view substantially on line 6—6 of Fig. 2 and on a larger scale.
Fig. 7 is a sectional view substantially on line 7—7 of Fig. 6.
Fig. 8 is a detail view of means for preventing backward movement of the tread feeding means.

The tread strip 10 is intermittently drawn forward over rolls 29 and advanced beneath cutter 12 and over roll 11 (see Fig. 4) by driven feed rolls 40 and 41 respectively engaging the lower and upper faces of the tread strip. The shaft 42 of roll 40 is journaled in side plates 25 of the frame, and one end is provided with a gear 43 (Fig. 3) which meshes with a gear 44 rotatably mounted on a shaft 45 secured to upright 20 of the frame. Intermittent rotation is imparted to gear 44 through a one-way coupling, best shown in Figs. 6 and 7, comprising a drum 46 secured as by screws 47 to the gear 44 and within which is mounted a notched disk 48. Spring pressed rollers 49 positioned in the notches 50 of the disk are adapted to wedge between the drum and disk in one direction of rotation of the latter to thereby drive the drum, while running freely in the drum when the disk is rotated in the opposite direction, in a well known manner. A face plate 51 secured to disk 48 by screws 52 is provided with a pin 53 positioned between and in the path of lugs 54 and 55 (Fig. 2) carried by a vertical link rod 56. The lower lug 55 is threaded on a screw 57, rotatably mounted in brackets 58 secured to the rod 56 and is provided with a squared section 59 for the application of a wrench. By rotation of screw 57 the position of the lug 55 may be adjusted. A set screw 60 holds lug 55 in adjusted position. The upper lug 54 is secured to the rod 56 by a set screw 61. The upper end of link rod 56 is pivoted to an arm 62 secured to a shaft 63 journaled in bearings 64 secured to uprights 20 of the frame, which shaft operates the tread knife as will shortly be described. The lower end of rod 56 is pivoted to an arm 65 secured to a rock shaft 66 driven by means later described. Referring to Fig. 6, lugs 54 and 55 are diagrammatically shown in full lines with relation to pin 53 at the start of the upward movement of rod 56 and the lugs carried thereby. As the rod moves up, lug 54 leaves pin 53 and the latter in the continued upward movement of the lugs is engaged by lug 55 and moved to dotted line position, thus advancing the gear 44 and rotating feed roll 40 to feed the tread forward the distance desired between cuts. On the return movement of rod 56 the pin is restored to initial position by engagement by the upper lug 54. A light spring 67, connected between a pin 68 secured to plate 51 and a bracket 69 secured to upright 20 (Fig. 2), prevents pin 53 from drifting downward away from lug 54, due to vibration of the machine. Upper feed roll 41, Figs. 3 and 4, is mounted on a shaft 70 journaled in the ends of arms 71 secured to a shaft 72 pivoted in bearing lugs 73 formed on side plates 25. One of the arms 71 is extended rearwardly of the shaft 72 as at 74. A threaded rod 75, pivotally connected to the end of extension 74, extends downwardly through an aperture formed in a bracket 76 secured to plate 25. A coiled spring 77, surrounding the rod 75 and compressed between the bracket 76 and nuts 78 locked on the rod, presses roll 41 into proper driving engagement with the tread stock while accommodating any slight inequalities in the tread thickness. Nuts 79 locked on the end of rod 75 limit the upward movement of the rod.

The upper feed roll 41 is driven from, and at the same speed as, lower feed roll 40 through a gear 80 (Fig. 1) secured to shaft 70 and meshing with a pinion 81, carried by the adjacent arm 71, which pinion meshes with a gear 82 rotatably mounted on the pivot shaft 72. Gear 82 is driven by a gear 83 (Fig. 2) mounted on a stub shaft 84 and to which is secured a sprocket 85, connected by a chain 86 to a sprocket 87 (Fig. 2) secured to the end of shaft 42 of the lower feed roll 40.

From the feed rolls 40 and 41 the tread strip passes around roll 11 beneath the cutter blade 12. As best shown in Fig. 4 and Fig. 9, blade 12 is carried by a rectangular supporting body formed of spaced cylindrical members 90 and 91 connected at intervals by members 92. The blade 12 is held by set screws 9 in the lower cylindrical member 91 which is provided with an electrical heating unit 93 for heating the blade. Upper member 90 is open at its ends and with members 92 acts to radiate the surplus heat, preventing its conduction to the operating parts. The cutting body is rigidly connected to the lower end of vertical rods 94, preferably in the form of hollow tubes to permit a circulation of air and reduce the conduction of heat to the bearing members, which extend upwardly through guiding bosses 95 (Fig. 2) formed in a slide 96, and are connected to a yoke bar 97 by nuts 98 threaded on the upper ends of the rods. The yoke bar 97 is connected for vertical adjustment to an operating bar 99 by a screw 100 rotatably mounted at 101 (Fig. 4) in the yoke bar and threaded in the operating bar as at 102. The upper end of screw 100 is provided with an operating handle 103. The ends of bar 99 are connected by links 104 (Fig. 2) to the ends of arms 105 secured to the rock shaft 63, receiving its motion from the rod 56, which as previously described actuates the tread feed rolls.

The slide 96 is mounted for adjusting movement in a direction longitudinally of the tread on ways 106 supported by cross members 107 extending between frame members 20. Adjustment of slide 96 is effected by a screw 108 threaded into the slide, as at 109 (Figs. 4 and 10), and rotatably mounted in a bearing 110 secured to the adjacent frame members 107 by machine bolts 111. Screw 108 is operated by means of a handle 112. Slide 96 also carries a presser roll 113 engaging the tread rearwardly of the knife 12 and roll 11. Roll 113 is journaled in a yoke 114 (Figs. 4 and 9), secured to the lower ends of rods 115 sliding in tubular guides 116 carried by slide 96. Roll 113 is forced downwardly into engagement with the tread to bend the latter downwardly around the rear portion of roll 11, and thus draw the rear wall of the cut away from the rear face of the knife, by springs 117 compressed between yoke 114 and the end of guides 116. The upper end of rods 115 are preferably tied together by a bar 118 secured to the rods by nuts 119.

After the opened cuts have been filled as later described, the tread passes between a belt 120 (Fig. 4) running freely around pulleys 121 and 122, and a belt 123 trained around pulleys 124, 125, and 126, belt 123 being driven at a slightly greater surface speed than the tread around roll 11. To keep the belts properly tensioned, pulley 122 is provided with a conventional take-up indicated at 127 and pulley 126 is mounted in a sliding bearing 128 held in belt-tightening position by a weight 130 connected to the bearing by a cable 131 passing over a pulley 132 (Fig. 3). It will be seen that as the tread passes between the belts around pulley 121 which is of small diameter the outer surface portion of the thread is compressively distorted, thus firmly bonding the inserted strips to the walls of the cuts. From belt 123 the tread is reversed in direction around a roll 135, which strips it from the belt and assures sufficient curvature in this reversal to prevent breaking of the bond between the inserts and the tread rubber. From roll 135 the tread is delivered to a belt 136 supported on a series of rolls 137, the end rolls acting as pulleys for the belt. As best shown in Fig. 1, belt 123 is driven from feed roll 40. The shaft 138 of pulley 125 is provided with a sprocket 139 connected by a chain 140 to a sprocket 141 secured to the shaft 42 of roll 40. Belt 136 is driven from gear 82 through a sprocket chain 143, connecting a sprocket 144 secured to gear 82 and a sprocket 145 on the shaft 146 of the rear pulley roll 137 of the belt. Shaft 138 is provided with a crank 147 by which the tread may be advanced through the machine by hand if desired. Reverse movement of shaft 138 is prevented by a disk 149, secured on shaft 138, the periphery of which runs against a spring-pressed roll 150 (Fig. 8) which wedges against bracket 151 upon reverse movement of the disk.

The means for inserting strips of material such as gum rubber into the cuts is mounted on the rectangular frame 26, which also carries the motor 155 from which the machine as a whole is driven.

Figure 11:
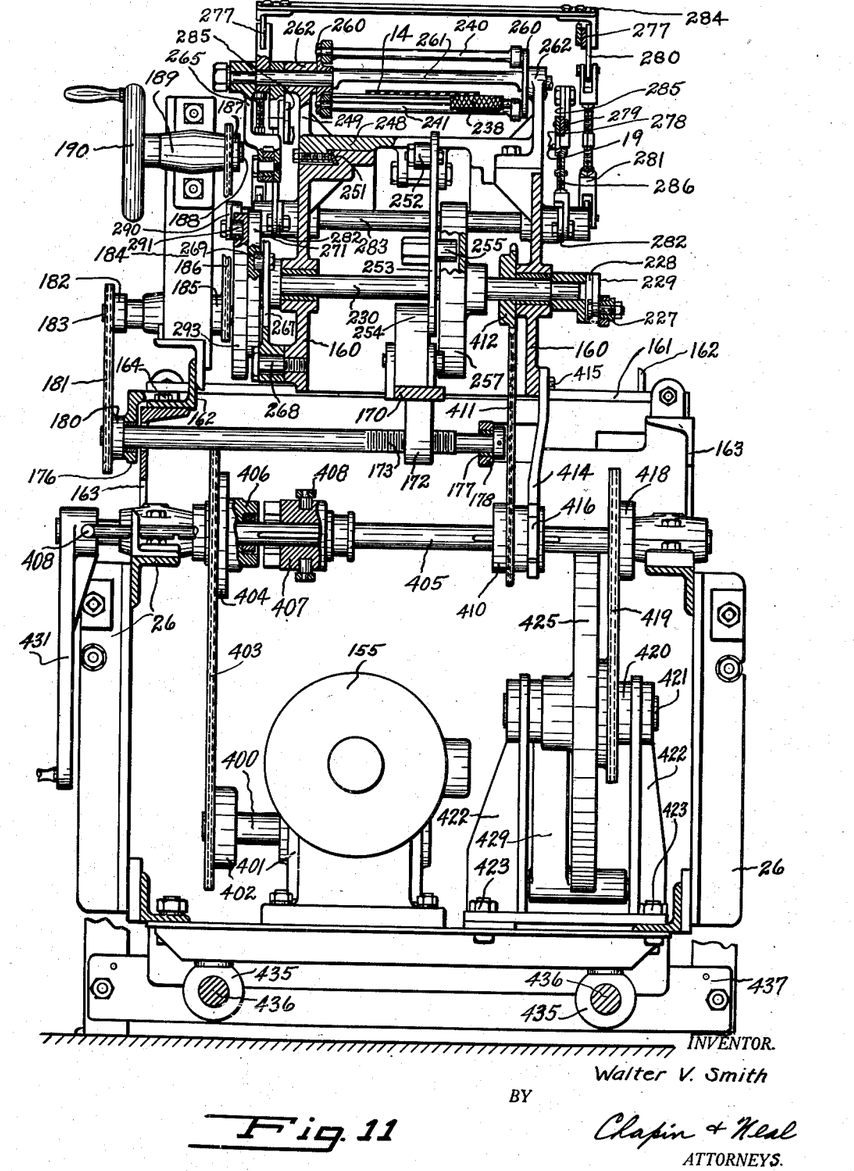
Fig. 11 is an end view of the strip inserting means, parts being in section and parts broken away.

The gum supply and inserting devices are carried by a box-like casting 160 slidably mounted on a rectangular frame comprising flanged cross members 161 (Fig. 4) connected together at their ends by members 162 (Figs. 3 and 11). The end member 162 rests upon brackets 163 secured to frame 26. As best shown in Fig. 3, the end members 162 are secured to the brackets 163 by bolts 164 extending through slots 165, permitting adjustment of the frame on the brackets by means of screws 166, extending through ears 167 secured to the bracket, and engaging the cross members 161. When the frame has been adjusted on the brackets, bolts 164 are tightened to hold it in adjusted position.

Casting 160 (see Fig. 4) is provided with flanges 169 which ride on members 161, and a bar 170 bolted to the flanges at 171 is provided with a downwardly extending lug 172 threaded on a shaft 173. Clips 175 bolted to the casting and engaging beneath the flanges of the members 161 keep the casting 160 in proper relation on the frame.

As best shown in Fig. 11, shaft 173 is journaled at one end in a bearing 176 secured to the adjacent member 162 and at the other in a bearing 177 formed in a member 178 secured between frame members 161. Shaft 173 is provided at one end with a sprocket 180 (see Figs. 3 and 11) connected by a chain 181 to a sprocket 182 mounted on a stub shaft 183 journaled in a bracket 184 supported from member 162. Shaft 183 carries a second sprocket 185 connected by a chain 186 to a sprocket 187 secured on a shaft 188 journaled in a bearing 189 secured to bracket 184. Shaft 188 is provided with a hand wheel 190 by which, through the chain drive just described, shaft 173 may be rotated to adjust casting 160, and the parts carried thereby, transversely of the machine.

The means for inserting the material in the tread cuts is carried by casting 160. This material, as best shown in Fig. 4, is supplied to the machine in the form of a strip or web 14 of a width equal to the length of the insert desired. This material, such as a relatively soft gum stock, is wound with a liner 196 to form a roll, indicated at 197, which is mounted on brackets 198 secured to casting 160. From roll 197 the web and its liner are drawn over a guide roll 199 and onto a platform 200. Platform 200 is provided with a slot 201 through which the liner is looped around a roll 202, thus stripping it from the web 14, to which it tends to adhere, so that when the liner reengages the web on the platform 200 the web lies freely on the liner. The rear portion of the platform 200 may be pivotally mounted to facilitate threading of the liner 196 around roll 202. From the platform the web and liner pass over a roll 204, the liner being carried around the roll and between it and a roll 205, while the web passes over a guide roll 206 to the inserter. As shown, roll 206 is driven by a belt 211 from roll 204. From rolls 204—205 the liner passes around one of a pair of rolls 203 and is wound into a roll 207 about an arbor 208 riding in guides 209, the roll 207, as it forms, resting on rolls 203.

Rolls 204 and 205 (see Fig. 3) are carried on shafts 210 and 212 respectively, journaled in sliding bearings 213 and 214, the bearings 213 of roll 204 being pressed toward bearings 214 by adjustable springs (not shown) carried in housings 215.

The shafts of rolls 204 and 205 are respectively provided with intermeshing gears 217 and 218 (Fig. 2) and the rolls are intermittently operated to advance the liner 196 and with it the gum strip 14 by means of a friction wheel 220 (Fig. 1) secured to the shaft 210 of roll 204. The wheel 220 is engaged by a friction pawl 221 pivoted to one arm of a bell crank 222 pivoted on shaft 210. The other arm of the bell crank is slotted at 223 to slidably receive a pivot pin 224 held in adjusted position in the slot by a screw 225. Pivot pin 224 is connected by a link 226 to a crank pin 227 adjustably secured in a slot 228 formed in an eccentric disk 229 (Figs. 1 and 11) secured to a shaft 230 which is journaled in casting 160 and is continuously driven as later described. The liner take-up is driven from a sprocket 231 secured to shaft 212 of roll 205 and connected by a chain 232 with a sprocket 233 on the shaft of one of the rolls 203, which rolls are connected together by a chain and sprocket drive, as indicated at 234, Fig. 1. Shaft 210 is preferably provided with a crank 235 by which the gum strip may be advanced by hand if desired.

Referring to Figs. 3 and 4, the gum strip 14 passes from roll 206 in a free loop and over an anti-friction roll 238 onto a platform 239. Platform 239 (Fig. 12), which may take the form of a screen, and roll 238, are carried by the lowermost of a pair of vertically spaced horizontal frames 240 and 241, respectively provided at their forward edges with gripper bars 15 and 16. The forward end of the gum strip extends between the bars 15—16 and is gripped by them when frames 240 and 241 are moved toward each other. The forward end of frames 240—241 are connected together at each side by a pair of lazy-tong links 245, the members of which are connected at one end to the frames by a pin and slot connection 246 and at the other end are pivoted to the frame at 247. The forward end of frames 240—241 are supported on a carriage 248 provided with lugs 249 in which the pivots 250 of the links 245 are journaled. Carriage 248 is slidably mounted on guides 251 (Fig. 11) formed on casting 160, and is reciprocated toward and from the tread by means of a link 252 connecting the carriage with the free end of a lever 253 pivoted at 254 to the bar 170. Lever 253 is provided with a cam roll 255 riding in a cam groove 256 formed in a cam 257 secured to the shaft 230 previously mentioned. Link 252 is spring cushioned as at 258 and is adjustably connected to lever 253 by means of a slot 259. By adjustment of this link the length of stock projecting beyond the grippers can be controlled.

The frames 240 and 241 are moved toward and from each other to grip and release the gum strip, by means of arms 260 secured on a rock shaft 261 journaled in brackets 262 mounted on casting 160. As best shown in Fig. 4, the opposite ends of arms 260 are connected to the side members of frames 240 and 241 by pin and slot connections 263. The end of shaft 261 is provided with a crank arm 265, Figs. 3 and 11, connected by a link 266 to the free end of a lever 267 pivoted at 268 (Fig. 11) to casting 160. Lever 267 is provided with cam roll 269 riding in groove 270 of a cam 271 secured to shaft 230. The connection between link 266 and lever 267 is cushioned by adjustable springs 272, thus cushioning the operation of the grippers.

Cams 257 and 271 are so timed that, as previously described, the grippers 15—16 engage the end of strip 14 when carriage 248 is in retracted position, and the forward movement of the carriage carries the strip into the cut and presses its end into adhering contact with the bottom of the tread cut. As the gripper carriage starts its return, the grippers are opened and move back along the strip, closing again when the carriage reaches its rearmost position. At this point the end portion of the gum strip, now positioned in the tread cut, is severed closely adjacent the grippers.

Figure 12:
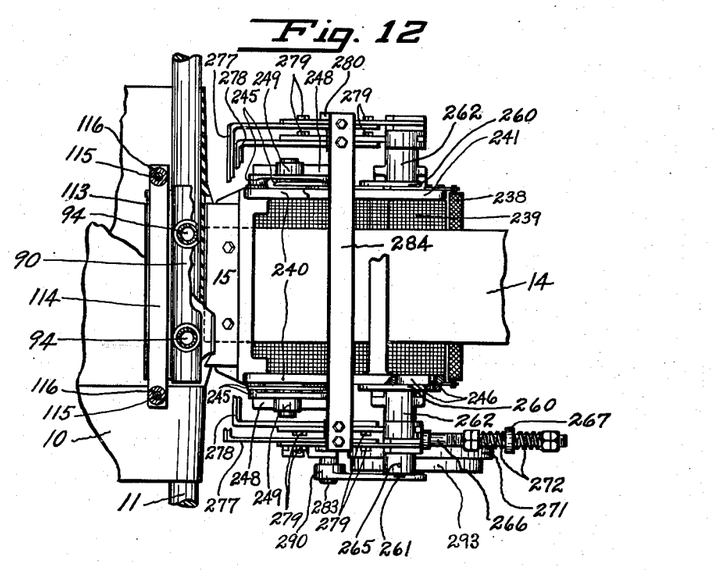
Fig. 12 is a detail plan view of the inserting means.

The means for so severing the gum strip comprises a cutting blade 18 and a cooperating platen 19. Blade 18 and platen 19 are respectively mounted on the forward ends of pairs of arms 277 and 278 pivoted on shaft 261 (Figs. 3, 11, and 12). The arms 277 and 278 are each made adjustable as to length by being formed in two parts connected together by bolt and slot connections 279. The cutter arms 277 are provided with downwardly extending lugs 280 which are connected by adjustable links 281 to lever arms 282 secured on opposite sides of the machine to a rock shaft 283 which is journaled in the sides of casting 160. The cutter arms 277 are connected by a brace 284. Each arm 278 is provided with a lug 285 (see Figs. 3, 4, and 11) connected by adjustable links 286 to lever arms 287 integral with lever 282 but extending in opposite directions. It will thus be seen that as shaft 283 is rocked, the blade 18 and platen 19 are swung toward and from each other. As shown in Fig. 4, blade 18 is provided with an electrical heating coil 288. The desired rocking movement is imparted to shaft 283 by an arm 290 secured to one end of the shaft and provided with a cam roll 291 riding in a groove 292 formed in a cam 293. Cam 293 is adjustably secured, as at 294, in back to back relation, to cam 271, which in turn is mounted on drive shaft 230.

Power is supplied to the shaft 230 from the motor 155 which drives a shaft 400 through a conventional gear reduction unit 401. Shaft 400 is provided with a sprocket 402 connected by a chain 403 to a sprocket 404 rotatably mounted on a shaft 405 journaled in suitable bearings on frame 26. Sprocket 404 is provided with a clutch member 406 (Fig. 11) adapted to be engaged by a clutch member 407 splined on shaft 405 and movable into driving engagement with the clutch member 406 by means of a clutch shifting lever 408 (Fig. 3). Slidably splined on shaft 405 is a sprocket 410 connected by a chain 411 to a sprocket 412 secured on cam shaft 230. As previously described, the casting 160 in which shaft 230 is mounted is adjustable transversely of frame 26 and, in order to maintain sprockets 410 and 412 in alignment, sprocket 410 is constrained to move along shaft 405 in company with the movement of sprocket 412 by means of a fork 414, bolted to casting 160 at 415, and engaging in groove 416 formed in the hub of sprocket 410.

A sprocket 418 fixed to shaft 405 is connected by a chain 419 to a sprocket 420 mounted on shaft 421 secured in spaced vertical brackets 422 mounted on frame 26 by bolts 423. Sprocket 420 is secured to a cam 425, Figs. 2, 3, and 4, also mounted on shaft 421 and provided with a cam groove 426 in which rides a cam roll 427 counted on one end of an adjustable link 428 and held in proper position in the cam groove by a guide arm 429. Link 428 is pivotally connected to the upper end of a lever 430 connected to rock the shaft 66 and from which, as previously described, the tread feeding, guiding, and cutting means receive their motion. To permit the various devices to be turned over by hand, if desired, shaft 405 is provided with a hand crank 431.

Figure 2:
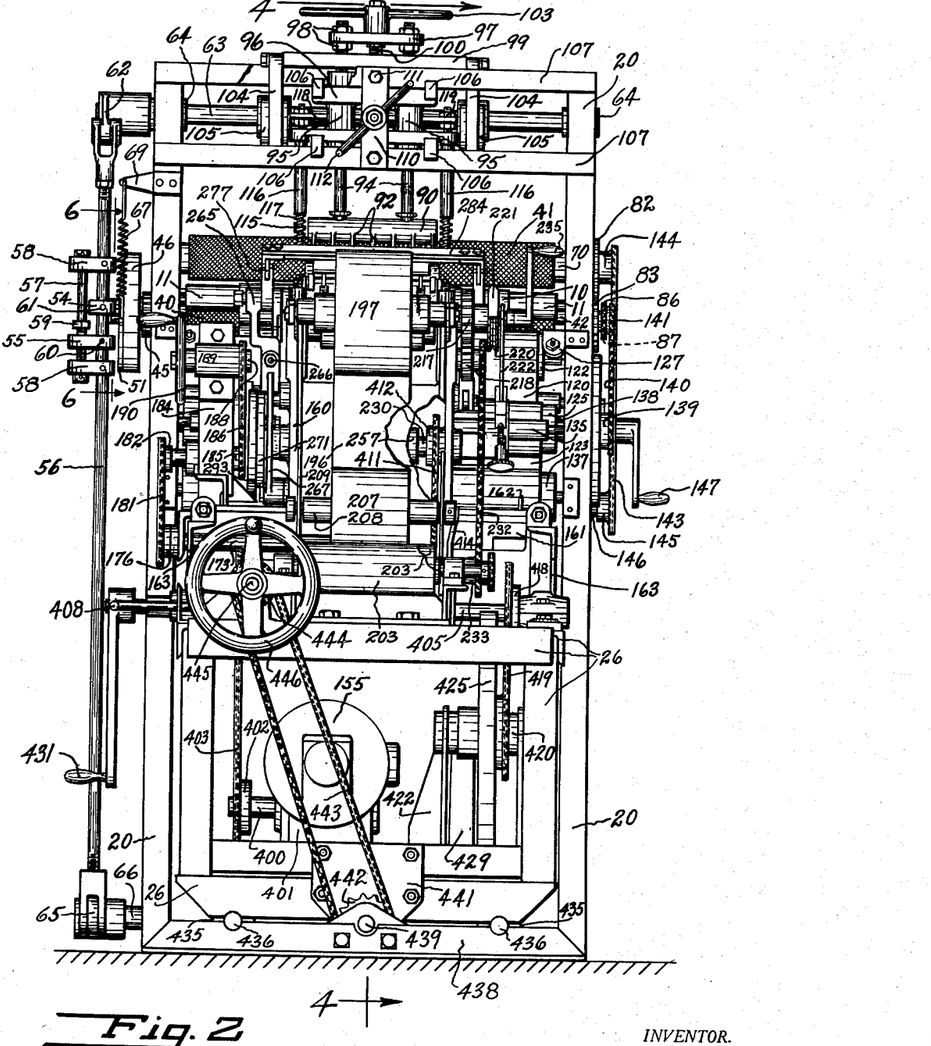
Fig. 2 is an end view looking from the left of Fig. 1 and on a larger scale, parts being broken away.
Figure 3:
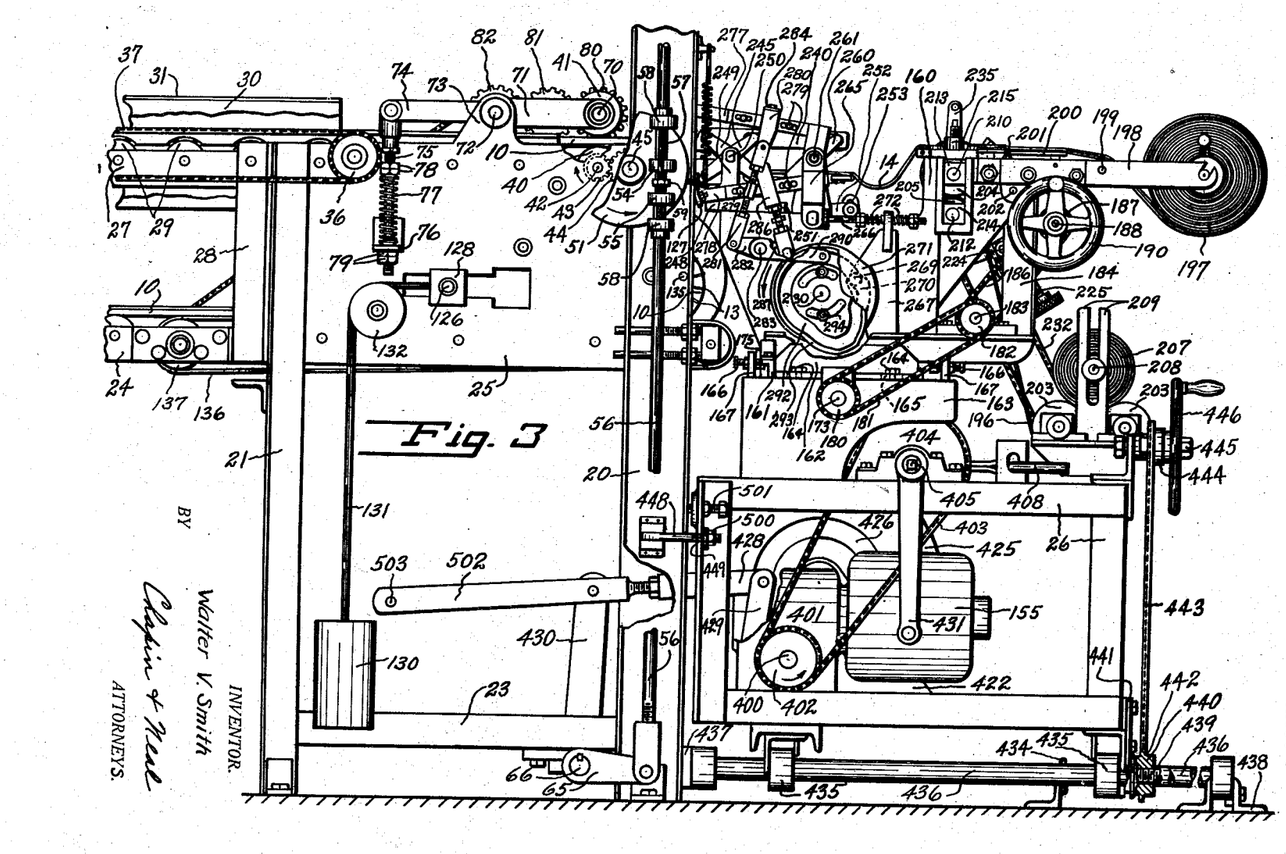
Fig. 3 is a side view, omitting the rear portion of the tread conveyer, showing the opposite side of the machine from that shown in Fig. 1 and on a larger scale.

As best shown in Figs. 2, 3, and 11, frame 26 is provided with bearing members 435 slidably mounted on spaced horizontal rods 436 secured at one end to a cross bar 437 secured to uprights 20 of the main frame and at their outer end to angle irons 438. A bar 434 and irons 438 similarly support a threaded rod 439 upon which a nut 440 travels. Nut 440 is rotatably mounted in a plate 441 secured to frame 26, and is formed with sprocket teeth 442. The nut 440 is adapted to be rotated to move the frame 26 along rods 436 by a sprocket chain 443 engaging sprocket 442 and passing around a sprocket 444 mounted on a stub shaft 445 journaled in frame 26. Stub shaft 445 is provided with a hand wheel 446.

The normal operative relation of frame 26 and the main frame is shown in Fig. 3 and the frames are releasably held in this position by swinging bolts 448 pivoted to the uprights 20 and engaging in slots 449 formed in frame 26. The exact relative position of frame 26 to the main frame can be nicely adjusted through nuts 500 threaded on bolts 448 and adjustable stops 501 threaded in the frame 26 and engaging uprights 20 of the main frame.

It is sometimes desirable to operate the various instrumentalities, for the purposes of adjustment, with the frame 26 in retracted position, and for this purpose link 428 is extended beyond its normal point of connection to the lever 430, as indicated at 502, and its free end is provided with an opening 503 for attachment to lever 430.

The tread strip is delivered from the machine (Fig. 1) onto a series of anti-friction rolls 505 journaled in frame members 24, and from which it may be removed for subsequent treatment in any desired manner. As shown, the end of the strip is looped back onto the end portion of the upper set of rolls 29 and against a stop 506 positioned a predetermined distance from a knife guide 507 provided with slots 508 through which the strip may be quickly severed into treads of appropriate length.

It will be understood that to provide the most satisfactory tread of the character the above described machine is designed to produce, the inserts must be accurately arranged in the tread. For best results the cuts must be accurately spaced and the inserts must be accurately and smoothly placed in the cuts. In the embodiment of the invention as disclosed, a complete adjustment of the various parts with respect to the materials operated upon and to each other is provided, as well as means for securing accurate timing of their operations.

Obviously, various changes and modifications can be made in the details of construction of the machine without departing from the scope of the invention, and it will be understood that the following references to certain preferred features are not to be construed as a limitation on claims not specifically directed thereto.

It is well known that freshly cut rubber surfaces, and particularly where the cutting has been done with a heated knife, are more readily bonded together than where the cuts are not fresh or are made with a cold knife. For this reason I prefer that the knives for cutting the tread and gum stocks shall be heated. Moreover, I have found it to be desirable that the tread which is relatively massive shall be warm at the time the insert-receiving cuts are made. I have further found that it is advantageous to form the cut in the tread slowly—that is, to let the heated tread knife "sink" into the tread. The advance of the knife is not so slow as to burn the rubber, but is such that the resilience of the rubber is temporarily destroyed as the knife advances. Such procedure makes possible much more accuracy in the depth of the cut, requires less power, and leaves the walls of the cut in better condition for satisfactory bonding with the inserted material. The insert can be placed immediately in the cut as, or as soon as, the knife is withdrawn, but slight delay in the insertion of the gum strip, such as that allowed by advancing the tread one or two cuts before inserting the gum stock, tends to improve the bonding between the gum and tread stocks. This delay in the insertion of the gum stock also makes it possible to perform the inserting operation while the knife is engaged in the tread strip, the knife thus assisting in holding the tread strip stationary during the inserting operation and further assuring the accuracy of the positioning of the cuts with reference to the inserting mechanism.

I claim:

1. A tread making machine which comprises means to form a cut in a strip of tread stock, means to open said cut, means to advance an end of a thin strip of material into adhering contact with the bottom of the cut, and means to sever the end portion from said thin strip of material to leave said severed portion in the cut.

2. A tread making machine which comprises means to distort a strip of tread stock to place the outer portion thereof under tension, means to form a cut in the distorted portion of the tread whereby the cut opens under the tension imposed by the distortion, and means to insert a thin piece of filler material edgewise into the so opened cut.

3. A tread making machine which comprises means to advance a strip of tread stock along a path curved in the plane of tread travel to place the outer portion thereof under tension, a cutting means for forming a cut in the so tensioned tread whereby the walls of the cut separate under said tension, and means acting prior to the release of the tread strip from tension to position a strip of filler material between the separated walls of the cut.

4. A tread making machine which comprises means for intermittently advancing a strip of tread stock, a reciprocable cutter beneath which the tread strip passes, means to tension the outer portion of the tread beneath the cutter, means to reciprocate the cutter to press the cutter into the tensioned portion of the tread, said tension acting to separate the walls of the cut as the cutter advances into the tread stock and to maintain said walls separated upon withdrawal of the cutter and during further advance of the tread strip, and means to insert a thin piece of filler material edgewise into the open cut to be gripped by the walls thereof upon release of the tread strip from tension.

5. A tread making machine which comprises means for intermittently advancing a strip of tread stock, a roll around which the strip advances and adapted to place the outer portion of the tread strip under tension, a heated cutter, means to reciprocate the cutter during the periods of rest of the strip to form a series of cuts in the tensioned portion of the strip, said tension acting to separate the walls of the cuts as the cutter advances into the tread and to maintain the walls separated upon withdrawal of the cutter and during successive advances of the tread strip, means operative during the periods of rest of the strip to successively project an end of a thin strip of material into adhering contact with the bottom of each previously formed cut as it comes to rest in front of the projecting means, and means to sever successive end portions from said thin strip to leave said portions in the cuts.

6. A tread making machine which comprises means to form a cut in a strip of tread stock, means to open said cut, gripping means engaging a strip of filler material adjacent its end and advancing it into adhering contact with the bottom of the cut, means to release the gripping means and heated means to sever the portion of the filler strip within the cut from the body of the strip.

7. A tread making machine which comprises means to form a cut in a strip of tread stock, means to open said cut, a pair of spaced cutting members, means to advance a strip of filler material between said cutters and into the open cut in the tread stock, and means to actuate said cutting members to sever the portion of the filler material within said cut from the strip of filler material.

8. A tread making machine which comprises means to form a cut in a strip of tread stock, means to open said cut, gripping members, means to reciprocate said gripping members into and out of said open cut, gripper actuating means to close said grippers when positioned outwardly of the cut to thereby engage a strip of filler material adjacent the end of said strip and advance the end portion of the strip into the cut upon forward movement of the grippers, and to open said grippers upon return movement of the latter to leave said end portion of the strip in the cut, a pair of spaced cutting members between which the grippers pass, and means to actuate said cutting members to sever the portion of the filler strip within the cut from the body of the strip.

9. A tread making machine which comprises means to advance a strip of tread stock along a path curved in the plane of tread travel to place the outer portion thereof under tension, a cutting means for forming cuts in the so tensioned tread whereby the walls of the cuts separate under said tension, means acting prior to the release of the tread strip from tension to position a strip of filler material between the separated walls of the cuts, and means for thereafter reversing the curvature of the tread strip during a subsequent portion of its travel to press the walls of the cuts into adhering contact with the filler strips.

10. In a tread making machine, a heated cutting member, means to advance said cutting member into the tread at a speed sufficiently slow so that the heat of the knife acts to destroy the elasticity of the rubber compound as the knife advances, and means to apply tension to the tread strip transversely of the line of cut to separate the walls of the cut from the knife as the knife advances into the rubber.

11. In a tread making machine, a heated cutting member, means to advance said cutting member into the tread at a speed sufficiently slow so that the heat of the knife acts to destroy the elasticity of the rubber compound as the knife advances, means to apply tension to the tread strip transversely of the line of cut to separate the walls of the cut from the knife as the knife advances into the rubber, and means to insert a strip of filler material into the cut while the walls of the cut are still tacky from the heat of the knife.

12. In a tread making machine a roll about which the tread is intermittently advanced, a cutting member movable substantially radially toward and from the roll to form transverse cuts in the tread, means movable substantially radially toward and from the roll and positioned substantially 90° from the cutting member for inserting a ribbon of filler material in the cuts formed by the cutting member, and means to actuate said cutting member and inserting means contemporaneously.

13. In a tread making machine, means to intermittently advance a strip of tread stock, means to form a cut in said strip, a carriage, means for moving said carriage toward and from the tread, gripping means mounted on said carriage for engaging a strip of filler material and advancing it into said cut, means to sever the portion of the filler strip within the cut from the body of the filler strip, a common support for said carriage and filler strip severing means, and manually operated means for moving said support transversely of the tread while the parts carried by the support are in operation.

14. In a tread making machine, means to intermittently advance a strip of tread stock, means to form cuts in said strip, a carriage, means for moving said carriage toward and from the tread, gripping means mounted on said carriage for engaging a strip of filler material and advancing it into said cut, means to sever the portion of the filler strip within the cut comprising spaced cutting members between which the grippers advance, a common support for the gripping and severing means, means for adjusting the position of said support relative to the tread, and means to adjust the travel of the carriage with respect to the cutting means.

15. In a tread making machine, a reciprocable knife support, a knife adjustably mounted on said support, means for advancing a tread strip beneath the knife, actuating means to move the knife support toward and from the tread to cause the knife to form a cut in the tread strip of a depth determined by the adjustment of the knife with respect to its support, and a one-way drive for the tread strip advancing means, having a lost motion connection with the knife actuating means, for advancing the tread during the return movement of the knife from cutting position, the amount of lost motion being sufficient to permit the knife to clear the tread strip before advance of the latter.

16. A tread making machine which comprises means to form a cut in a strip of tread stock, means to open said cut, means for supplying filler material for the cut, a carriage movable between the tread stock and said filler supply means, and means on the carriage for receiving material from the supply means and delivering it into the opened cut.

17. A machine for inserting material in a body of unvulcanized rubber which comprises, means to form a cut in said body, means to spread the walls of the cut, and conveyer means bodily movable into and out of the spread cut to transport said material into and deposit said material in the cut.

18. A machine for inserting material in a body of unvulcanized rubber which comprises means to form a plurality of spaced cuts in a body of unvulcanized rubber, means to temporarily apply tension to the strip to hold the cuts open, and conveyer means bodily movable into and out of the so opened cuts to transport said material into and deposit material in each of the cuts.

19. A machine for inserting material in a body of unvulcanized rubber which comprises means to form a cut in a body of unvulcanized rubber, means to insert the end portion of a strip of material into the cut, and means to sever the inserted portion from the strip.

20. In a machine for inserting material into a cut formed in a body of unvulcanized rubber, means to spread the walls of the cut without obstructing the interior of the cut, means to feed material into the cut while the walls are so spread, and means to vary the amount of material placed in the cut by the feeding means.

21. In a machine for inserting material into a cut formed in a body of unvulcanized rubber, means to spread the walls of the cut without obstructing the interior of the cut, means to feed a flat strip of material into the cut while the walls are so spread, and means to predetermine the position of the strip in the cut.

WALTER V. SMITH.